United States Patent
Ying et al.

(10) Patent No.: US 11,206,580 B2
(45) Date of Patent: Dec. 21, 2021

(54) COMMUNICATION METHOD AND COMMUNICATIONS APPARATUS

(71) Applicant: Huawei Technologies Co., Ltd., Shenzhen (CN)

(72) Inventors: Jiangwei Ying, Beijing (CN); Yanmei Yang, Beijing (CN); Zhenglei Huang, Beijing (CN); Hui Ni, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/577,917

(22) Filed: Sep. 20, 2019

(65) Prior Publication Data

US 2020/0037205 A1 Jan. 30, 2020

Related U.S. Application Data

(63) Continuation of application No. PCT/CN2017/077582, filed on Mar. 21, 2017.

(51) Int. Cl.
*H04W 28/22* (2009.01)
*H04W 76/10* (2018.01)
(Continued)

(52) U.S. Cl.
CPC ........... *H04W 28/22* (2013.01); *H04W 8/08* (2013.01); *H04W 48/16* (2013.01);
(Continued)

(58) Field of Classification Search
CPC ..... H04W 28/22; H04W 74/08; H04W 76/10; H04W 8/08; H04W 48/16; H04W 68/005; H04W 84/042
See application file for complete search history.

(56) References Cited

U.S. PATENT DOCUMENTS 10,117,279 B2 * 10/2018 Chen ................... H04W 76/18
10,419,980 B2 * 9/2019 Lee .................... H04W 36/0011
(Continued)

FOREIGN PATENT DOCUMENTS

CN     1968501 A    5/2007
CN   101420764 A    4/2009
(Continued)

OTHER PUBLICATIONS

3GPP TS 23.501 V0.3.1: "3rd Generation Partnership Project;Technical Specification Group Services and System Aspects; System Architecture for the 5G System; Stage 2 (Release 15)", Mar. 2017, 97 pages.

(Continued)

*Primary Examiner* — Khawar Iqbal
(74) *Attorney, Agent, or Firm* — Slater Matsil, LLP

(57) ABSTRACT

A communication method and a communications apparatus, the method including obtaining, by a session management function entity, parameter information, determining, by the session management function entity, an access technology type for a protocol data unit (PDU) session of a terminal device according to the parameter information, and sending, by the session management function entity, indication information to an access and mobility management function entity, where the indication information indicates the access technology type of the PDU session.

20 Claims, 10 Drawing Sheets

(51) Int. Cl.
*H04W 68/00* (2009.01)
*H04W 8/08* (2009.01)
*H04W 48/16* (2009.01)
*H04W 84/04* (2009.01)

(52) U.S. Cl.
CPC ......... *H04W 68/005* (2013.01); *H04W 76/10* (2018.02); *H04W 84/042* (2013.01)

(56) References Cited

U.S. PATENT DOCUMENTS

| | | | | |
|---|---|---|---|---|
| 10,812,977 | B2* | 10/2020 | Li | H04W 36/14 |
| 2010/0254334 | A1 | 10/2010 | Lin et al. | |
| 2017/0094501 | A1 | 3/2017 | Huang-Fu | |
| 2018/0198867 | A1* | 7/2018 | Dao | H04W 36/0033 |
| 2018/0227743 | A1* | 8/2018 | Faccin | H04W 76/10 |
| 2018/0270715 | A1* | 9/2018 | Lee | H04W 36/0011 |
| 2018/0270888 | A1* | 9/2018 | Faccin | H04W 76/15 |
| 2019/0150219 | A1* | 5/2019 | Wang | H04W 76/30 370/329 |
| 2019/0182788 | A1* | 6/2019 | Lee | H04W 60/00 |
| 2019/0364541 | A1* | 11/2019 | Ryu | H04W 76/25 |
| 2019/0387490 | A1* | 12/2019 | Li | H04W 8/02 |
| 2020/0100101 | A1* | 3/2020 | Torvinen | H04W 12/106 |
| 2020/0137672 | A1* | 4/2020 | Rommer | H04W 76/25 |
| 2020/0163145 | A1* | 5/2020 | Park | H04W 76/18 |
| 2020/0304982 | A1* | 9/2020 | Xu | H04W 36/0016 |
| 2020/0314950 | A1* | 10/2020 | Dao | H04L 65/1089 |
| 2020/0329450 | A1* | 10/2020 | Youn | H04W 60/06 |
| 2021/0014721 | A1* | 1/2021 | Youn | H04W 28/06 |
| 2021/0051474 | A1* | 2/2021 | Dao | H04W 12/06 |
| 2021/0076297 | A1* | 3/2021 | Salkintzis | H04L 45/306 |

FOREIGN PATENT DOCUMENTS

| | | |
|---|---|---|
| CN | 102369780 A | 3/2012 |
| CN | 102469586 A | 5/2012 |
| CN | 102595636 A | 7/2012 |
| CN | 103428636 A | 12/2013 |
| CN | 105007143 A | 10/2015 |
| CN | 105723797 A | 6/2016 |
| EP | 2416525 A1 | 2/2012 |
| WO | 2011018724 A1 | 2/2011 |
| WO | 2018167219 A2 | 9/2018 |

OTHER PUBLICATIONS

3GPP TS 23.502 V0.2.0 : "3rd Generation Partnership Project; Technical Specification Group Services and System Aspects; Procedures for the 5G System; Stage 2 (Release 15)", Feb. 2017, 71 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2017/077582, filed on Mar. 21, 2017, the disclosure of which is hereby incorporated by reference in its entirety.

TECHNICAL FIELD

The present disclosure relates to the field of communications technologies, and in particular, to a communication method and a communications apparatus.

BACKGROUND

To meet widely changed service requirements, a fifth generation (5G) network is constructed in a flexible manner. A potential direction is separation between network functions, to be specific, separation between a control plane (CP) and a user plane (UP), and separation between a mobility management (MM) function and a session management (SM) function on the CP.

A 5G network slice technology is slicing one physical network into a plurality of end-to-end virtual networks. Each virtual network, including a device, an access technology, a transmission path, and a core network on the network, is logically independent. Each network slice is constituted by instantiating one independent network function or function combination, has a different function and feature, and is oriented towards a different requirement and service. Separation of network slices enables different users or user groups to define and customize network capabilities flexibly and dynamically based on different application scenarios and requirements of the users or user groups, and the network slices do not affect each other.

A network slice includes a control plane function (CPF) entity and a user plane function (UPF) entity. The CPF entity includes an access and mobility management function (AMF) entity that is mainly configured to complete access authentication, security encryption, location registration, and the like of a terminal device, and a session management function (SMF) entity that is configured for establishment, release, modification, and the like of a user plane transmission path. The UPF entity mainly completes functions such as routing and forwarding of user plane data.

A terminal device may access a core network by using a plurality of access technologies (AT), for example, may access the core network by using a 3rd generation partnership project (3GPP) access technology, or may access the core network by using a non-3GPP access technology. Regardless of which type of AT is used to access the core network, in a 5G architecture, on a core network side, an AMF entity is responsible for access control and mobility management of radio access, and an SMF is responsible for session management of the radio access.

In the prior art, an AT type appropriate to be used for a PDU session is not defined, and therefore a most appropriate AT link cannot be activated or restored for the PDU session.

SUMMARY

Embodiments of the present disclosure provide a communication method and a communications apparatus, to resolve a prior-art technical problem that an appropriate access technology type cannot be effectively selected in a multi-access-technology scenario.

According to a first aspect, an embodiment of the present disclosure provides a communication method. The method includes obtaining, by a session management function entity, parameter information, determining, by the session management function entity, an access technology type for a protocol data unit PDU session of a terminal device based on the parameter information, and sending, by the session management function entity, indication information to an access and mobility management function entity, where the indication information is used to indicate the access technology type of the PDU session. In this method, the session management function entity can determine the AT type of the PDU session of the terminal device, and can notify the access and mobility management function entity of the determined AT type, so that the access and mobility management function entity sends, to a network node of an AT corresponding to the indicated AT type, a session management message received from the session management function entity, or instructs the terminal device to activate the PDU session based on the determined AT type. Therefore, this method provides a processing manner of effectively determining an appropriate access technology type in a multi-access-technology scenario.

In a possible design, the parameter information includes at least one type of the following information: a service and session continuity (SSC) mode of the PDU session, a quality of service (QoS) attribute of the PDU session, a policy control and charging PCC rule of the PDU session, subscription information of the terminal device, and an access technology type indicated by the terminal device. Because the foregoing parameter information can reflect which access technology type is appropriate for the PDU session, the AT type determined based on the parameter is more appropriate for the PDU session.

In a possible design, the parameter information is the SSC mode of the PDU session, and the determining, by the session management function entity, an access technology type for a PDU session of the terminal device based on the parameter information includes if the SSC mode of the PDU session represents that the PDU session supports service and session continuity, determining, by the session management function entity, that the access technology type of the PDU session is a 3rd generation partnership project 3GPP access technology. In this method, a more appropriate access technology type can be determined for the PDU session.

In a possible design, the parameter information is the QoS attribute of the PDU session, and the determining, by the session management function entity, an access technology type for a PDU session of the terminal device based on the parameter information includes if the QoS attribute of the PDU session is a guaranteed bit rate GBR type, determining, by the session management function entity, that the access technology type of the PDU session is a 3rd generation partnership project 3GPP access technology. In this method, a more appropriate access technology type can be determined for the PDU session.

In a possible design, the parameter information is the PCC rule of the PDU session and the QoS attribute of the PDU session, and the determining, by the session management function entity, an access technology type for a PDU session of the terminal device based on the parameter information includes determining, by the session management function entity, the access technology type of the PDU session based on a correspondence that is included in the PCC rule of the PDU session and that is between a QoS attribute and a preset access technology type and based on the QoS attribute of the PDU session. In this method, a more appropriate access technology type can be determined for the PDU session.

In a possible design, the parameter information is the subscription information, and the determining, by the session management function entity, an access technology type for a PDU session of the terminal device based on the parameter information includes determining, by the session management function entity as the access technology type of the PDU session, an access technology type allowed to be used in the subscription information. In this method, a more appropriate access technology type can be determined for the PDU session.

In a possible design, the subscription information includes a mapping relationship between an access technology type and a data network name (DNN), and the session management function entity determines the access technology type of the PDU session based on the mapping relationship between an access technology type and a DNN and based on a DNN corresponding to the PDU session.

In a possible design, the parameter information includes the access technology type indicated by the terminal device and/or the service and session continuity SSC mode of the PDU session, and the obtaining, by a session management function entity, parameter information includes receiving, by the session management function entity, a first N11 message sent by the access and mobility management function entity, where the first N11 message includes a PDU session establishment request, the PDU session establishment request is used to request to establish the PDU session for the terminal device, and the PDU session establishment request includes the parameter information, and obtaining, by the session management function entity, the parameter information from the PDU session establishment request. In this method, the terminal device can autonomously provide the parameter information, so that the session management function entity determines the access technology type for the PDU session of the terminal device. Therefore, the access technology type determined in this method is more appropriate for the PDU session of the terminal device.

In a possible design, the indication information is carried in a second N11 message or a session management message. In this method, the indication information can be sent by multiplexing an existing message, such as the second N11 message or the session management message. In addition, the indication information is carried in the session management message, so that the access and mobility management function entity directly routes a downlink session management message based on the AT type indicated in the session management message.

According to a second aspect, an embodiment of the present disclosure provides a communication method. The method includes receiving, by an access and mobility management function entity, indication information sent by a session management function entity, where the indication information is used to indicate an access technology type of a protocol data unit PDU session of a terminal device, and when a link of an access technology indicated by the access technology type is in a connected mode, sending, by the access and mobility management function entity to a network node of the access technology indicated by the access technology type, a session management message received from the session management function entity, or when a link of an access technology indicated by the access technology type is in an idle mode, sending, by the access and mobility management function entity, the indication information to the terminal device. In this method, the access and mobility management function entity can route a downlink session management message based on the determined AT type, so that the access and mobility management function entity efficiently routes the downlink session management message, or send, to the terminal device, the indication information indicating the access technology type, so that the terminal device activates the PDU session based on the access technology type indicated by the indication information. Therefore, in a multi-access-technology scenario, the terminal device activates the PDU session for which the appropriate access technology type is used.

In a possible design, the indication information is carried in a second N11 message or the session management message.

In a possible design, the sending, by the access and mobility management function entity, the indication information to the terminal device includes when the terminal device is in an idle mode, sending, by the access and mobility management function entity, a paging message to the terminal device by using the access technology indicated by the access technology type, where the paging message includes the indication information, or when the terminal device is in a connected mode and the link that is of the access technology indicated by the access technology type and that is used by the terminal device is in an idle mode, sending, by the access and mobility management function entity, the indication information to the terminal device over a connected-mode link that is of another access technology and that is used by the terminal device, or when the terminal device is in a connected mode and the link that is of the access technology indicated by the access technology type and that is used by the terminal device is in an idle mode, sending, by the access and mobility management function entity, a paging message to the terminal device over the link of the access technology indicated by the access technology type, where the paging message includes the indication information. In this method, it can be ensured that the indication information is sent to the terminal device.

According to a third aspect, an embodiment of the present disclosure provides a communications apparatus. Specifically, the apparatus may be a session management function entity. The communications apparatus has functions of implementing the session management function entity in the foregoing method designs. These functions may be implemented by hardware, or may be implemented by hardware by executing corresponding software. The hardware or the software includes one or more units corresponding to the functions.

In a possible design, a specific structure of the communications apparatus used as the session management function entity may include a receiving unit, a processing unit, and a sending unit. The receiving unit, the processing unit, and the sending unit may implement corresponding functions in the foregoing method.

According to a fourth aspect, an embodiment of the present disclosure provides a communications apparatus. Specifically, the apparatus may be an access and mobility management function entity. The communications apparatus has functions of implementing the access and mobility management function entity in the foregoing method designs. These functions may be implemented by hardware, or may be implemented by hardware by executing corresponding software. The hardware or the software includes one or more units corresponding to the functions.

In a possible design, a specific structure of the communications apparatus used as the access and mobility management function entity may include a receiving unit and a sending unit. The receiving unit and the sending unit may implement corresponding functions in the foregoing method.

According to a fifth aspect, an embodiment of the present disclosure provides a network element. The network element may be a session management function entity. The network element includes a memory configured to store computer executable program code, a receiver, a transmitter, and a processor. The processor is coupled to the memory, the receiver, and the transmitter. The program code includes an instruction. When the processor executes the instruction, the instruction enables the network element to perform the foregoing method performed by the session management function entity.

According to a sixth aspect, an embodiment of the present disclosure provides a network element. The network element may be an access and mobility management function entity. The network element includes a memory configured to store computer executable program code, a receiver, a transmitter, and a processor. The processor is coupled to the memory, the receiver, and the transmitter. The program code includes an instruction. When the processor executes the instruction, the instruction enables the network element to perform the foregoing method performed by the access and mobility management function entity.

According to a seventh aspect, an embodiment of the present disclosure provides a computer storage medium. The computer storage medium is configured to store a computer software instruction used by the communications apparatus described in the third aspect or the network element described in the fifth aspect, and includes a program designed for executing the foregoing aspects.

According to an eighth aspect, an embodiment of the present disclosure provides a computer storage medium. The computer storage medium is configured to store a computer software instruction used by the communications apparatus described in the fourth aspect or the network element described in the sixth aspect, and includes a program designed for executing the foregoing aspects.

DETAILED DESCRIPTION OF ILLUSTRATIVE EMBODIMENTS

Embodiments of the present disclosure provide a communication method and a communications apparatus, to resolve a prior-art technical problem that an appropriate access technology type cannot be effectively selected in a multi-access-technology scenario.

To make the objective, technical solutions, and advantages of the embodiments of the present disclosure clearer, the following describes the technical solutions in the embodiments of the present disclosure with reference to the accompanying drawings in the embodiments of the present disclosure.

Figure 1A:
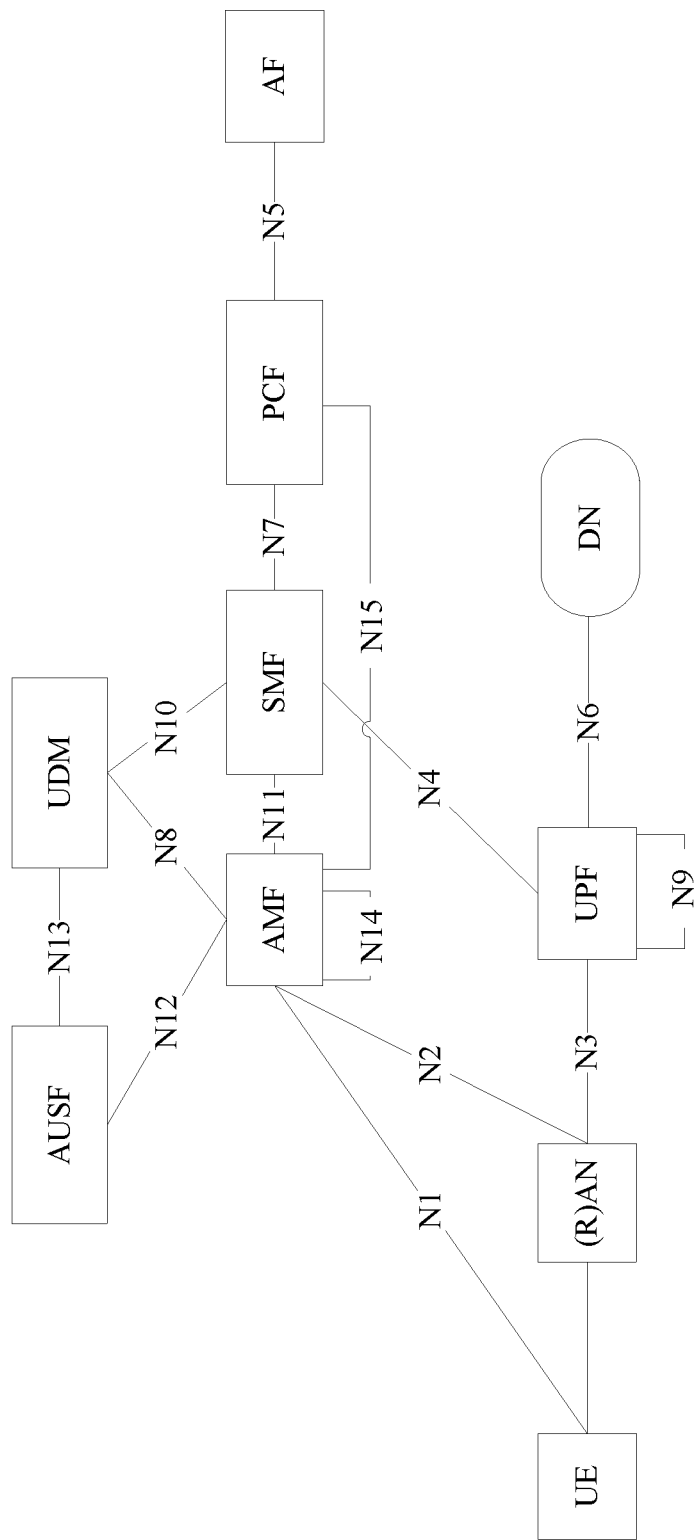
FIG. 1a and FIG. 1b are structural diagrams of a network system according to an embodiment of the present disclosure.
Figure 1B:
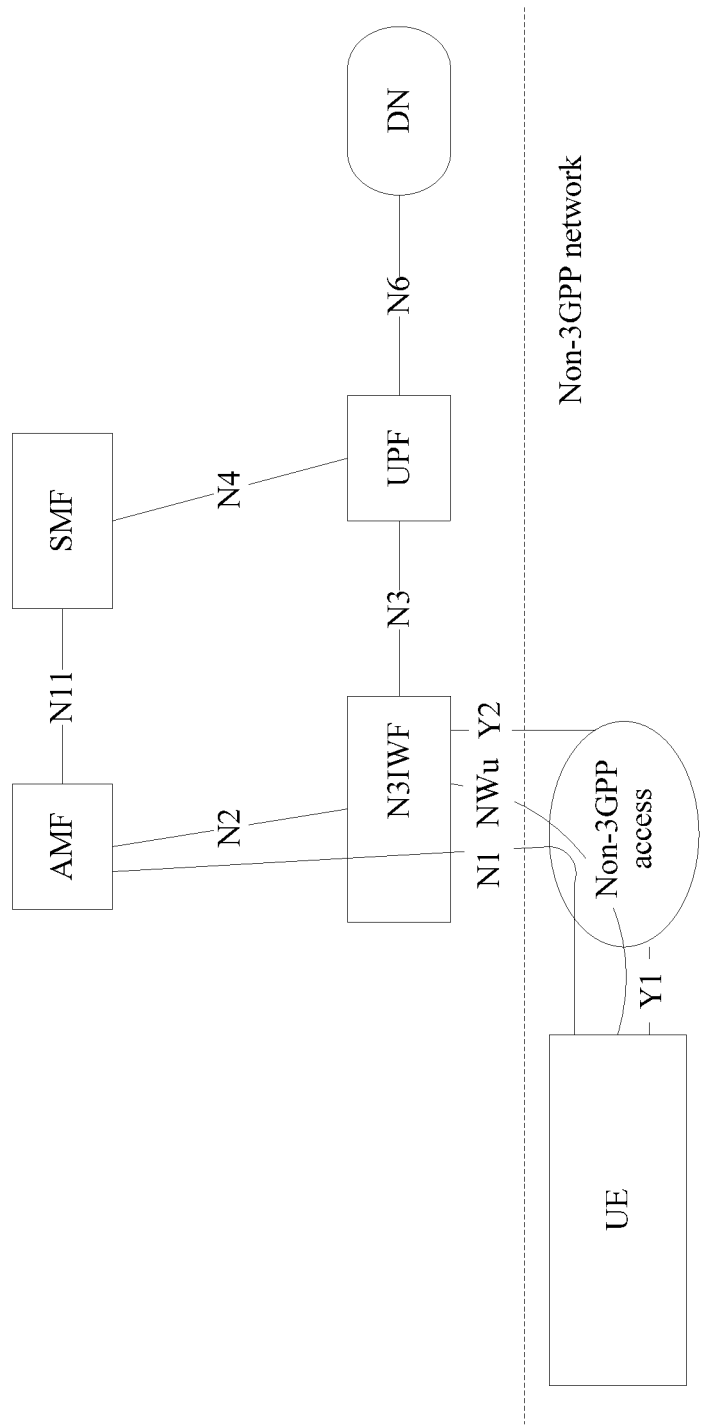

An embodiment of the present disclosure provides a communication method, and the method may be applied to a communications system. In this method, an access technology (AT) type of a PDU session can be determined. The AT type in this embodiment of the present disclosure may be a 3GPP access technology, or may be a non-3GPP access technology. FIG. 1a and FIG. 1b are structural diagrams of a possible communications system according to an embodiment of the present disclosure. A structure shown in FIG. 1a is a structural diagram of a network system in which a terminal device (UE) accesses a core network by using a 3GPP access technology. A structure shown in FIG. 1b is a structural diagram of a network system in which UE accesses a core network by using a non-3GPP access technology.

Specifically, a function of each network entity or network element is as follows.

A (radio) access network ((R)AN) is a network including a plurality of (R)AN nodes, and implements a radio physical layer function, resource scheduling and radio resource management, radio access control, and a mobility management function. The (R)AN is connected to a UPF entity through a user plane interface N3, to transmit data of the terminal device (UE). The (R)AN establishes a control plane signaling connection to an AMF entity through a control plane interface N2, to implement a function such as radio access bearer control.

The AMF entity is mainly responsible for functions such as terminal device authentication, terminal device mobility management, network slice selection, and SMF entity selection, serves as an anchor of an N1 signaling connection and an N2 signaling connection and provides routing of an N1 SM message and an N2 SM message for an SMF entity, and maintains and manages terminal device status information.

The SMF entity is connected to the AMF entity through an N11 interface, and is mainly responsible for all control plane functions in terminal device session management. The control plane functions include UPF entity selection, Internet protocol (IP) address allocation, management of quality of service (QoS) attribute of a session, obtaining a policy control and charging (PCC) rule from a policy control function (PCF) entity, and the like.

The PCF entity is connected to the SMF entity through an N7 interface and is connected to the AMF entity through an N15 interface. The PCF entity is configured to generate and store a PCC rule related to session management, and provide the PCC rule for the SMF entity, and is further configured to generate policy information related to mobility management, and provide the policy information for the AMF entity.

An application function (AF) entity is connected to the PCF entity through an N5 interface, and is configured to interact with the PCF entity, so that the PCF generates a corresponding PCC rule.

The UPF entity is connected to the SMF entity through an N4 interface. The UPF entity serves as a protocol data unit (PDU) session connection anchor, and is responsible for data packet filtering, data transmission or forwarding, rate control, and charging information generation for the terminal device.

A data network (DN) is connected to the UPF entity through an N6 interface, and is configured to generate downlink data that needs to be sent to the terminal device, and receive uplink data sent by the terminal device.

An authentication server function (AUSF) entity is connected to the AMF entity through an interface N12, and is configured to obtain a security authentication vector. The security authentication vector is used to perform security authentication between the UE and a network.

A user data management (UDM) entity is connected to the AMF entity through an N8 interface, is connected to the SMF entity through an N10 interface, and is connected to the AUSF entity through an N13 interface. The UDM entity is configured to store user-related subscription information, and respectively provide subscription-related parameter information for the corresponding entities through the N8 interface, the N10 interface, and the N13 interface.

It should be noted that an N9 interface represents an interface between two UPF entities, and an N14 interface represents an interface between two AMF entities.

Different from a system architecture shown in FIG. 1a, in a system architecture shown in FIG. 1b, the UE is connected to a network node of a non-3GPP network through a Y1 interface, the UE may be further connected to a non-3GPP interworking function (N3IWF) entity through an NWu interface, the N3IWF entity is connected to the network node of the non-3GPP network through a Y2 interface, the UE is connected to an AMF entity by using the network node of the non-3GPP access network, and the AMF entity is connected to the N3IWF entity through an N2 interface. The N3IWF entity is configured to provide an access service for a non-3GPP access technology. The access service includes UE authentication, establishment of an IPsec security channel with the UE, establishment of an N2 signaling connection to the AMF entity, establishment of an N3 data connection to a UPF entity, and the like.

It should be understood that physically, the entities shown in FIG. 1a and FIG. 1b each may be a single device, or two or more of the entities may be integrated into a same physical device. This is not specifically limited in this embodiment of the present disclosure.

The terminal device mentioned in this specification may be a wireless terminal device, or may be a wired terminal device. The wireless terminal device may be a device that provides voice and/or other service data connectivity for a user, a handheld device with a wireless connection function, or another processing device connected to a wireless modem. The wireless terminal device may communicate with one or more core networks through a radio access network (RAN). The wireless terminal device may be a mobile terminal, such as a mobile phone (or referred to as a "cellular" phone) or a computer with a mobile terminal. For example, the wireless terminal device may be a portable, pocket-sized, handheld, computer built-in, or vehicle-mounted mobile apparatus that exchanges voice and/or data with the radio access network. For example, the wireless terminal device may be a device such as a personal communications service (PCS) phone, a cordless phone, a session initiation protocol (SIP) phone, a wireless local loop (WLL) station, or a personal digital assistant (PDA). The wireless terminal device may also be referred to as a system, a subscriber unit, a subscriber station, a mobile station, a mobile, a remote station, a remote terminal, an access terminal, a user terminal, a user agent, or user equipment (UE, User Device or User Equipment).

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Some English abbreviations in this specification are used to describe the embodiments of the present disclosure by using an LTE system and a current 5G network system as examples, and the English abbreviations may change with network evolution. For specific evolution, refer to descriptions in a corresponding standard.

Figure 2:
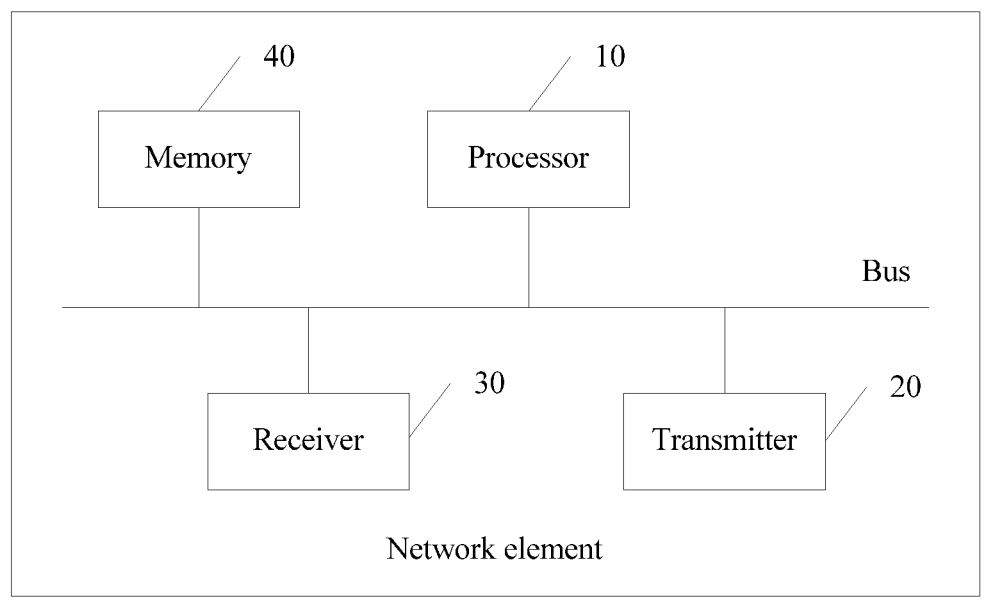
FIG. 2 is a structural diagram of a network element according to an embodiment of the present disclosure.

Next, FIG. 2 is a possible structural diagram of a network element according to an embodiment of the present disclosure. For example, the network element is each function entity in FIG. 1a and FIG. 1b. As shown in FIG. 2, the network element includes a processor 10, a transmitter 20, a receiver 30, and a memory 40. The memory 40, the transmitter 20, the receiver 30, and the processor 10 may be connected by using a bus. Certainly, during actual application, the memory 40, the transmitter 20, the receiver 30, and the processor 10 may not be of a bus structure, but may be of another structure such as a star-shaped structure. This is not specifically limited in this application.

Optionally, the processor 10 may be specifically a general-purpose central processing unit or an application-specific integrated circuit (ASIC), may be one or more integrated circuits configured to control program execution, may be a hardware circuit developed by using a field programmable gate array (FPGA), or may be a baseband processor.

Optionally, the processor 10 may include at least one processing core.

Optionally, the memory 40 may include one or more of a read-only memory (ROM), a random access memory (RAM), and a magnetic disk memory. The memory 40 is configured to store data and/or an instruction that are/is required when the processor 10 runs. There may be one or more memories 40.

Optionally, the transmitter 20 and the receiver 30 may be independent of each other or may be integrated together physically.

It should be noted that if the network element is connected to another network element in a wireless manner, the transmitter 20 and the receiver 30 may be radio frequency circuits. If the network element is connected to another network element in a wired manner, the transmitter 20 is a transmit port, and the receiver 30 is a receive port.

Figure 3:
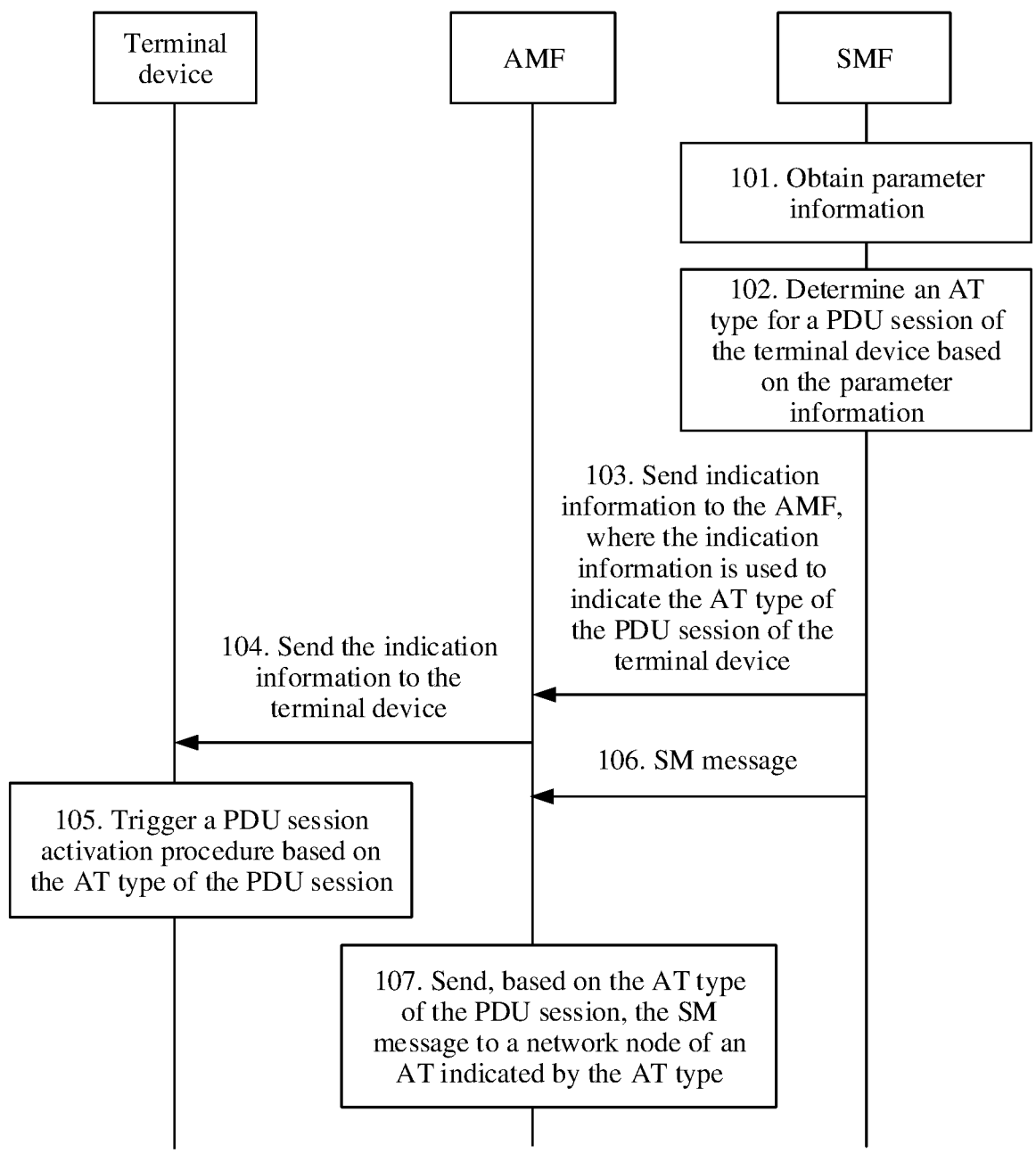
FIG. 3 is a flowchart of a communication method according to an embodiment of the present disclosure.

Next, FIG. 3 is a flowchart of a communication method according to an embodiment, and may also be understood as a schematic diagram of information exchange among the UE, the AMF entity, and the SMF entity in the architectures shown in FIG. 1a and FIG. 1b. The method includes the following content.

Step 101: An SMF entity obtains parameter information.

Step 102: The SMF entity determines an AT type for a PDU session of a terminal device based on the parameter information.

Step 103: The SMF entity sends indication information to an AMF entity, where the indication information is used to indicate the AT type of the PDU session.

Optionally, the parameter information obtained in step 101 may be one or any combination of the following parameters: a service and session continuity (SSC) mode of the PDU session, a QoS attribute of the PDU session, a PCC rule of the PDU session, subscription information of the terminal device, a data network name (DNN) corresponding to the PDU session, and an AT type indicated by the terminal device.

Optionally, if the parameter information includes the AT type indicated by the terminal device and/or the SSC mode of the PDU session, in step 101, the SMF entity receives a first N11 message sent by the AMF entity, where the first N11 message includes a PDU session establishment request, the PDU session establishment request includes the parameter information, the PDU session establishment request is used to request to establish the PDU session for the terminal device in step 102, and the first N11 message further includes an identifier of the terminal device, and the SMF entity obtains the AT type indicated by the terminal device and/or the SSC mode of the PDU session from the PDU session establishment request.

Optionally, the first N11 message further includes a DNN. The DNN may be sent by the terminal device to the AMF entity, and then the AMF entity adds the DNN to the first N11 message and sends the first N11 message to the SMF entity.

Optionally, in step 101, the SMF entity may obtain the subscription information of the terminal device from a UDM entity, and this part of subscription information may include an authorized PDU type, an authorized SSC mode, and a default QoS attribute.

Optionally, the subscription information further includes an AT type allowed to be used. If there are two or more AT types allowed to be used, the subscription information further includes information indicating an AT type preferred by the terminal device.

Optionally, the subscription information further includes a mapping relationship between an AT type and a DNN. For example, an AT type corresponding to the Internet of vehicles is a 3GPP AT type, and an AT type corresponding to machine-to-machine (M2M) or the Internet of things (IoT) is a non-3GPP AT type.

If the SMF entity has stored the subscription information of the terminal device, the SMF entity may not need to obtain the subscription information of the terminal device from the UDM entity.

The PDU type is used to represent whether the PDU session is a PDU session of the Internet protocol (IP) version 4, namely, IPv4, or a PDU session of the IP version 6, namely, IPv6.

The SSC mode is used to indicate the service and session continuity mode of the PDU session. Currently, there may be three SSC modes. In a mode 1, an anchor, namely, a UPF entity, of an IP address of the UE is fixed, and service continuity is supported. In a mode 2, an anchor, namely, a UPF entity, of an IP address is variable, and the SMF entity may first release a PDU session, and then instruct the terminal device to establish a new PDU session. In a mode 3, the SMF entity releases an original PDU session only after establishing a new PDU session for the terminal device.

The QoS attribute may reflect a QoS requirement of the PDU session, and the QoS attribute may be represented by using a plurality of parameters, such as a guaranteed bit rate (GBR). Optionally, another parameter may be alternatively used as a consideration factor, for example, a data packet delay or a packet loss rate.

Optionally, in step 101, the SMF entity may obtain the PCC rule of the PDU session from a PCF entity. For example, the SMF entity may initiate a PDU-connectivity access network (CAN) session establishment request to the PCF entity, and the PCF entity may add the PCC rule to a PDU-CAN session establishment response.

It should be noted that, during actual application, the parameter information obtained in step 101 may be alternatively other parameter information, and an obtaining manner is not limited to the manner described above.

Optionally, step 102 may be performed in a PDU session establishment process, or may be performed after the PDU session is established and when the PDU session is in a deactivated state and the SMF entity receives a downlink data notification (DDN) that is sent by a UPF entity and that indicates that there is downlink data to be sent to the terminal device. That the PDU session is in a deactivated state means that no end-to-end data connection is established between the terminal device and the UPF entity, and therefore uplink or downlink data cannot be transmitted between the terminal device and the UPF entity, and that the SMF entity stores a PDU session context, but the PDU session context does not include N3 tunnel information allocated by a next-generation radio access network (NG-RAN). The N3 tunnel information is used to transmit downlink data.

Step 102 may be implemented in a plurality of manners based on different parameter information. The following uses examples for description.

In a first possible implementation, if the parameter information is the SSC mode of the PDU session, step 102 includes if the SSC mode represents that the PDU session supports service and session continuity, the SMF entity determines that the AT type of the PDU session is a 3GPP access technology type. For example, if the SSC mode is the foregoing mode 1, it indicates that the PDU session supports service and session continuity.

It should be noted that the SSC mode of the PDU session in this embodiment may be carried in the PDU session establishment request, or may be the authorized SSC mode included in the subscription information. Optionally, the SSC mode carried in the PDU session establishment request needs to be one of authorized SSC modes. If the SSC mode carried in the PDU session establishment request is not one of the authorized SSC modes, the SMF entity may not make reference to the SSC mode carried in the PDU session establishment request, but make reference to only the authorized SSC mode.

In a second possible implementation, if the parameter information is the QoS attribute of the PDU session, step 102 includes if the QoS attribute is a GBR type, the SMF entity determines that the AT type of the PDU session is a 3GPP access technology type. The QoS attribute is the GBR type, indicating that the PDU session requires a guaranteed bit transmission rate. Therefore, the 3GPP RAT is more appropriate to be used to transmit data of the PDU session.

It should be noted that the QoS attribute in this embodiment may be the default QoS attribute in the subscription information, may be a QoS attribute in the PCC rule, or may be a QoS attribute that is of the PDU session and that is stored in the SMF entity.

In a third possible implementation, if the parameter information is the PCC rule of the PDU session and the QoS attribute of the PDU session, step 102 includes the SMF entity determines the AT type of the PDU session based on a correspondence that is included in the PCC rule and that is between the QoS attribute of the PDU session and a preset AT type. For example, the QoS attribute includes two cases:

a GBR type and a non-GBR type, and the PCC rule has the following content: A preset AT type corresponding to the GBR type is a 3GPP AT type, or a preset AT type corresponding to the non-GBR type is a non-3GPP AT type. Therefore, the SMF entity may determine the AT type of the PDU session based on the correspondence included in the PCC rule. For example, if the PCC rule includes that the QoS attribute of the PDU session is a GBR type and that a corresponding preset AT type is a 3GPP AT type, the AT type that is of the PDU session and that is determined in this manner is the 3GPP AT type corresponding to the GBR type.

In a fourth possible implementation, if the parameter information is the subscription information of the terminal device, step 102 includes the SMF entity determines, as the AT type of the PDU session, an AT type allowed to be used in the subscription information. For example, if the subscription information indicates that the terminal device allows only non-3GPP access, in step 102, it may be determined that the AT type of the PDU session is a non-3GPP AT type. For another example, if the subscription information indicates that the terminal device allows both non-3GPP access and 3GPP access, and indicates that the terminal device prefers the 3GPP access, in step 102, it may be determined that the AT type of the PDU session is a 3GPP AT type.

In a fifth possible implementation, if the parameter information is the AT type indicated by the terminal device, step 102 includes The SMF entity needs to use the AT type indicated by the terminal device as one piece of reference information for determining the AT type of the PDU session. For example, it is assumed that the SMF learns, based on another reference factor, that both a 3GPP AT type and a non-3GPP AT type are available. In this case, if the AT type indicated by the terminal device is the 3GPP AT type, the SMF entity finally determines that the AT type of the PDU session is the 3GPP AT type. Certainly, during actual application, the SMF entity may directly determine, as the AT type of the PDU session, the AT type indicated by the terminal device.

In a sixth possible implementation, if the parameter information is the subscription information of the terminal device and the QoS attribute of the PDU session, step 102 includes the SMF entity determines the AT type of the PDU session based on the subscription information of the terminal device and the QoS attribute of the PDU session. For example, the subscription information indicates that both 3GPP access and non-3GPP access may be performed, but indicates no preferred AT type. In this case, if the QoS attribute is a GBR type, the SMF entity may determine that the AT type of the PDU session is a 3GPP AT type. For another example, when the subscription information indicates that an AT type preferred by the terminal device is non-3GPP, and the QoS attribute is a non-GBR type (both 3GPP access and non-3GPP access may be performed), the SMF entity may determine that the AT type of the PDU session is a non-3GPP AT type.

In a seventh possible implementation, if the parameter information is the AT type indicated by the terminal device and the QoS attribute of the PDU session, step 102 includes the SMF entity determines the AT type of the PDU session based on the AT type indicated by the terminal device and the QoS attribute of the PDU session. For example, if the QoS attribute is a non-GBR type, and the AT type indicated by the terminal device is a non-3GPP AT type, the SMF entity may determine that the AT type of the PDU session is the non-3GPP AT type.

In an eighth possible implementation, if the parameter information is the mapping relationship between an AT type and a DNN, step 102 includes the SMF entity determines the AT type of the PDU session based on the mapping relationship between an AT type and a DNN and based on the DNN corresponding to the PDU session. For example, the mapping relationship between an AT type and a DNN includes an AT type corresponding to the Internet of vehicles is a 3GPP AT type, and an AT type corresponding to each of M2M and the IoT is a non-3GPP AT type, and the DNN that is of the PDU session and that is obtained by the SMF entity is the Internet of vehicles. Therefore, the SMF entity may determine that the AT type of the PDU session is the 3GPP AT type.

The foregoing examples describe some specific implementations of step 102. However, during actual application, the SMF entity may alternatively determine the AT type of the PDU session based on another parameter combination or single parameter. For example, a priority is set for the parameter information. The AT type of the PDU session may be first determined based on the SSC mode of the PDU session. If the AT type of the PDU session cannot be determined based on the SSC mode, the AT type of the PDU session is further determined based on the QoS attribute of the PDU session. For brevity of this specification, details are not listed one by one.

After determining the AT type of the PDU session in step 102, the SMF entity may perform step 103, to be specific, send the indication information to the AMF entity, where the indication information is used to indicate the AT type of the PDU session of the terminal device. During actual application, step 103 may be performed on different occasions, and the indication information may be sent in different manners. The following uses examples for description.

According to an aspect, if step 102 is performed in the PDU session establishment process, the indication information may be sent to the AMF entity in the PDU session establishment process. For example, the indication information is sent through an N11 interface. For example, the indication information is added to a second N11 message and the second N11 message is sent to the AMF entity. For example, the second N11 message is a session management request acknowledgement. In addition to the indication information, the session management request acknowledgement may further carry a PDU session establishment accept message. Certainly, during actual application, the indication information may be alternatively sent by using a newly defined N11 message. This is not specifically limited in this embodiment of the present disclosure.

According to another aspect, if step 102 is performed in the PDU session establishment process, the SMF entity may store a correspondence between a PDU session and an AT type, and may not send the indication information to the AMF entity temporarily. After the PDU session is established and when the PDU session is in a deactivated state, if the SMF entity receives the DDN sent by the UPF entity or receives a PDU session activation request from the AMF entity (if the AMF entity receives, from the UE, a service request that carries a PDU session identifier (ID), the AMF entity instructs the SMF entity to activate the PDU session corresponding to the PDU session ID), the SMF entity sends the indication information to the AMF entity. The SMF entity may send the indication information to the AMF entity through an N11 interface. Optionally, the indication information is included in a first N11 interface message sent by the SMF entity to the AMF entity after the SMF entity receives the DDN.

According to still another aspect, if step 102 is performed when the SMF entity receives the DDN sent by the UPF entity, step 103 may be subsequently performed. For example, the SMF entity may send the indication information to the AMF entity through an N11 interface. Optionally, the indication information is included in a first N11 interface message sent by the SMF entity to the AMF entity after the SMF entity receives the DDN.

According to yet another aspect, if step 102 is performed in the PDU session establishment process, the SMF entity may store a correspondence between a PDU session and an AT type, and may not send the indication information to the AMF entity temporarily. After the PDU session is established and when the PDU session is in an activated state or a deactivated state, if the SMF needs to send a session management message, the SMF entity may add the indication information to the session management message, for example, to a message header of the session management message. For example, a bit in the message header of the session management message is used to indicate the AT type. For example, a bit 0 indicates that the AT type is a 3GPP AT type, and a bit 1 indicates that the AT type is a non-3GPP AT type. Certainly, the bit values herein are merely examples for description. During actual application, the bit may be alternatively padded with other values to indicate different AT types, and the indication information may be alternatively carried in another part of the session management message. Correspondingly, when receiving the session management message, the AMF entity can learn of the AT type of the PDU session by parsing the session management message.

After the SMF entity performs step 103, correspondingly, the AMF entity receives the indication information sent by the SMF entity. Optionally, the AMF entity may perform step 104, to be specific, send the indication information to the terminal device, so that the terminal device can activate the PDU session based on the AT type indicated by the indication information. In other words, the PDU session in step 102 may be a PDU session to be established for the terminal device, or may be a PDU session that has been established for the terminal device and that is in a deactivated state.

It should be noted that, after the PDU session is established and after step 102 is performed, the PDU session corresponds to two AT types. One AT type is an AT type used when the PDU session is established, and the other type is the AT type determined in step 102. The two AT types may be the same or may be different. If a link of an AT corresponding to the AT type indicated by the indication information is in an idle mode, the AMF entity performs step 104, so that the terminal device activates the PDU session based on the indicated AT type. Optionally, if the PDU session cannot be activated based on the indicated AT type, the PDU session may be activated by using another AT type.

During actual application, step 104 may also be implemented in a plurality of manners based on different cases. The following uses examples for description.

A first implementation of step 104 includes if the terminal device is in an idle mode, to be specific, when links that are of ATs indicated by all AT types and that are used by the terminal device are in an idle mode, the AMF entity sends a paging message to the terminal device over the link of the AT corresponding to the AT type indicated by the indication information, where the paging message includes the indication information. For example, when the terminal device is in an idle mode, it indicates that none of data links of the AT types is established. For example, there is neither a data link corresponding to a 3GPP access technology nor a data link corresponding to a non-3GPP access technology. Therefore, the AMF entity can send the paging message to the terminal device over the link of the AT corresponding to the AT type indicated by the indication information. For example, if the AT type indicated by the indication information is a 3GPP type, the AMF entity may add the indication information to a 3GPP-side paging message, to notify the terminal device which AT type is determined.

Optionally, if the terminal device is in an idle mode, to be specific, when links that are of corresponding ATs indicated by all AT types and that are used by the terminal device are in an idle mode, the AMF entity may always send a paging message to the terminal device over a link of an AT corresponding to an 3GPP AT, where the paging message includes the indication information.

A second implementation of step 104 includes if the terminal device is in a connected mode and the link that is of the AT corresponding to the AT type indicated by the indication information and that is used by the terminal device is in an idle mode, the AMF entity sends the indication information to the terminal device over a connected-mode link that is of another access technology and that is used by the terminal device. For example, the AT type indicated by the indication information is a 3GPP type. However, in this case, a link of a 3GPP access technology corresponding to the 3GPP type is in an idle mode. Therefore, the AMF entity can send the indication information to the terminal device over the connected-mode link that is of the another access technology and that is used by the terminal device, for example, a link corresponding to a non-3GPP access technology.

A third implementation of step 104 includes if the terminal device is in a connected mode and the link that is of the access technology corresponding to the AT type indicated by the indication information and that is used by the terminal device is in an idle mode, the AMF entity sends a paging message to the terminal device over the link of the access technology corresponding to the AT type indicated by the indication information, where the paging message includes the indication information. For example, the AT type indicated by the indication information is a 3GPP type. However, in this case, a link of a 3GPP access technology corresponding to the 3GPP type is in an idle mode. Therefore, the AMF entity can add the indication information to a 3GPP-side paging message, to notify the terminal device which AT type is determined.

After the AMF entity sends the indication information to the terminal device in step 104, if the terminal device is in the PDU session establishment procedure, the terminal device may continue to establish the PDU session. If the PDU session has been established, but the PDU session is in a deactivated state, the terminal device may activate the PDU session based on the AT type indicated by the indication information, to enable the PDU session to be in an activated state. That the PDU session is in an activated state means that an end-to-end data connection is established between the terminal device and the UPF entity, and therefore uplink or downlink data can be transmitted between the terminal device and the UPF entity, and that the SMF entity stores a PDU session context including N3 tunnel information allocated by an NG-RAN.

A case in which the terminal device may continue to establish the PDU session includes establishing an air-interface data radio bearer (DRB) of the PDU session and a tunnel connection on an N3 interface.

When the terminal device may activate or restore the PDU session based on the AT type indicated by the indication information, the terminal device activates the PDU session by initiating a service request procedure of the indicated AT type, including establishing an air-interface DRB of the PDU session and a tunnel connection on an N3 interface. If the PDU session cannot be successfully restored by using the link of the AT corresponding to the indicated AT type, the terminal device may attempt to restore the PDU session to access a network by using an AT corresponding to another AT type.

Optionally, after the PDU session is established and when the PDU session is in an activated state or a deactivated state, if the link of the AT corresponding to the indicated AT type is in a connected mode, the method further includes step 106 and step 107, to be specific, the AMF entity receives an SM message sent by the SMF entity, and sends, based on the AT type of the PDU session, the SM message to a network node of the AT indicated by the AT type. Therefore, an implementation of step 106 and step 107 and an implementation of step 104 and step 105 are two parallel implementations, and a sequence of the two implementations is not limited.

For example, if the AT type indicated by the indication information is a 3GPP AT type, the AMF entity may send the SM message to a network node of a 3GPP AT, for example, the (R)AN in FIG. 1a. If the AT type indicated by the indication information is a non-3GPP AT type, the AMF entity may send the SM message to a network node in a non-3GPP network, for example, the N3IWF entity in FIG. 1b.

When the SMF entity and the AMF entity are separated, one of services provided by the AMF entity is routing a message of the terminal device, including routing an SM message such as non-access stratum (NAS) SM signaling (signaling between the terminal device and the SMF entity) and N2 SM signaling (signaling between the next-generation radio access network and the SMF entity) of the terminal device. For uplink signaling, because the AMF entity stores an association relationship between a PDU session ID and an SMF entity identifier, the AMF entity can route an SM message to a corresponding SMF entity based on a PDU session ID in an SM message header.

However, for downlink signaling, in the prior art, it is only specified that an SM message should be sent to a current serving NG-RAN network node. Therefore, when there are links of a plurality of ATs, the AMF entity cannot determine a specific AT whose link is to be used to send the SM message. Therefore, according to the method in this embodiment of the present disclosure, when receiving the SM message, the AMF entity may send, based on the indicated AT type, the SM message to the network node of the AT indicated by the AT type. In other words, the AMF entity may send the SM message over the link of the AT corresponding to the indicated AT type.

It should be noted that, optionally, in a possible case, after the PDU session is established, only one AT link is allowed to serve the PDU session at one moment. For example, at one moment, only a link of a 3GPP access technology can provide a data transmission service for the PDU session, or only a link of a non-3GPP access technology can provide data transmission for the PDU session. Optionally, in another possible case, after the PDU session is established, two AT links can be allowed to serve the PDU session at one moment. For example, at one moment, both a link of a 3GPP access technology and a link of a non-3GPP access technology for the PDU session can provide data transmission for the PDU session. In both the two cases, the AMF entity may route the SM message based on the AT type carried in the SM message. The SM message may be a NAS SM message (SM message exchanged between the UE and the SMF) and an N2 SM message (message exchanged between the NG-RAN and the SMF).

In addition, it should be noted that, optionally, the foregoing has the description that the SMF entity may add the AT type to the SM message when sending the SM message to the AMF entity. However, during actual application, optionally, when the SM message is sent to the AMF entity, an N11 interface message carrying the SM message may include indication information to indicate the AT type. Therefore, the AMF entity may route the SM message based on the AT type indicated by the indication information sent together with the SM message. A specific routing manner is described above.

Figure 4A:
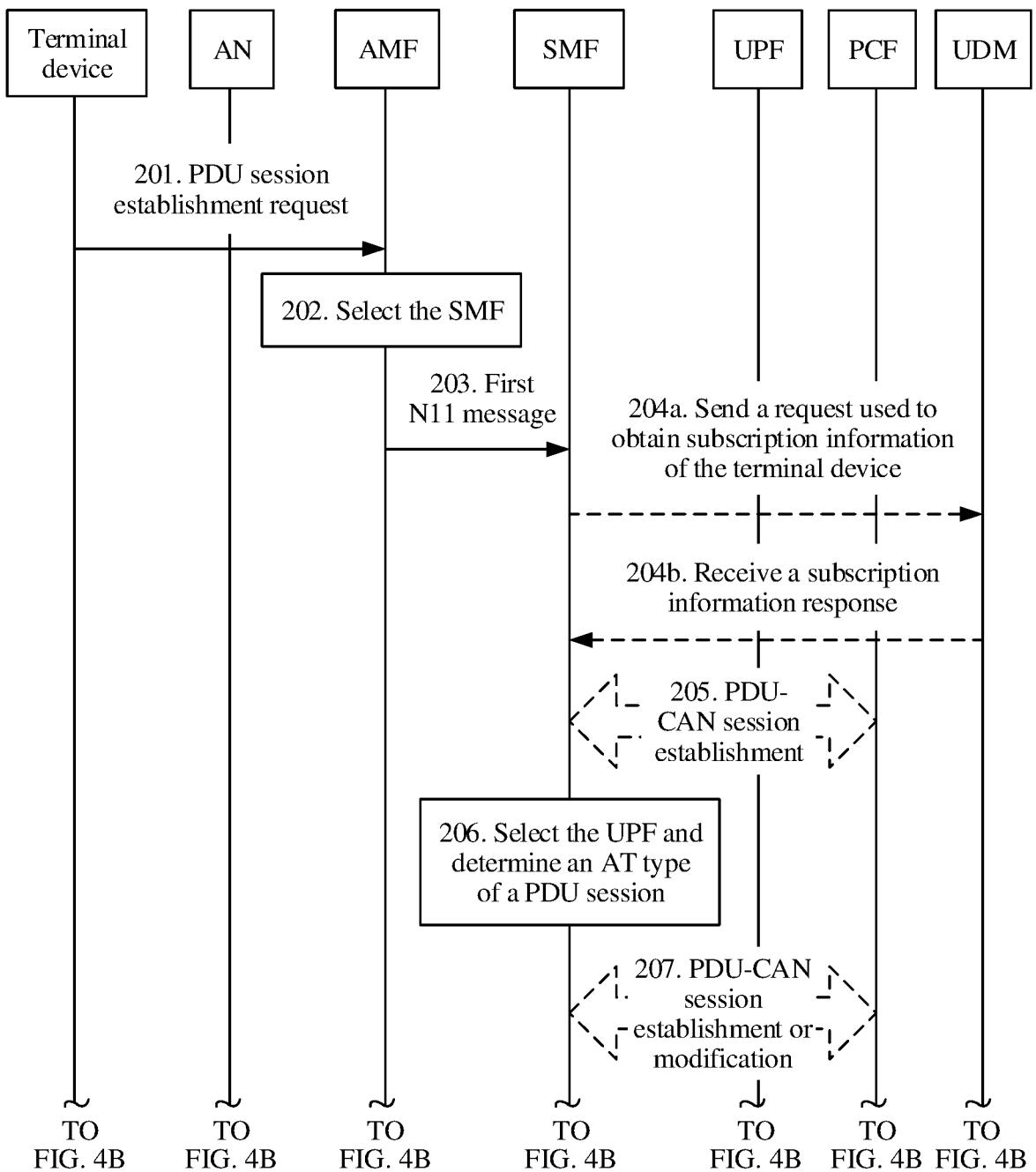
FIG. 4A and FIG. 4B are a flowchart of a specific example of a communication method according to an embodiment of the present disclosure.
Figure 4B:
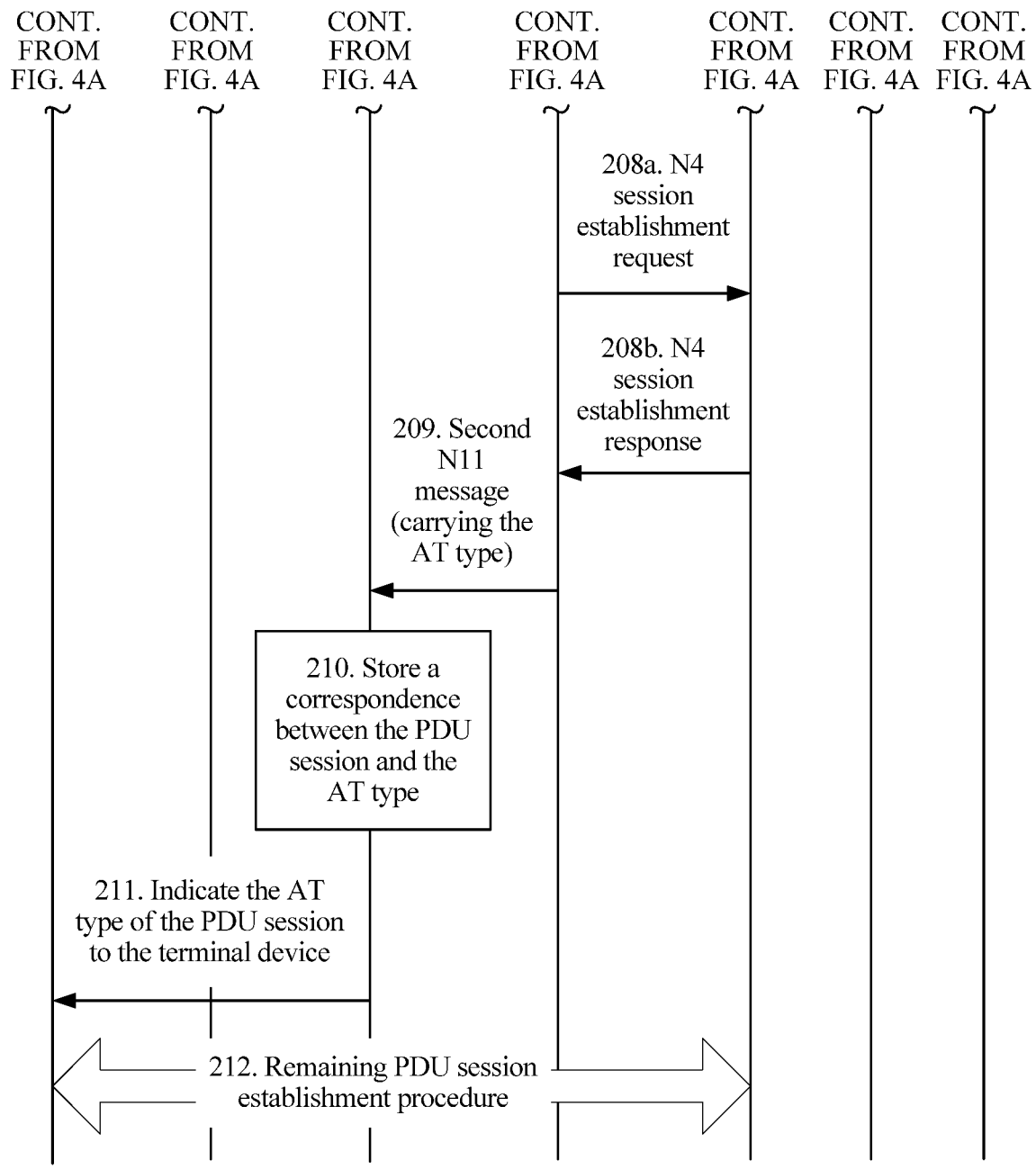

Next, specific implementations of the communication method in the embodiments of the present disclosure are described by using specific examples. FIG. 4A and FIG. 4B are a flowchart of an example of a communication mode according to an embodiment of the present disclosure. In this embodiment of the present disclosure, an AT type of a PDU session is determined in a PDU session establishment process, and an SMF entity sends, to an AMF entity by using a second N11 message, indication information used to indicate the AT type. As shown in FIG. 4A and FIG. 4B, the method includes the following steps.

Step 201: A terminal device sends a PDU session establishment request to an AMF entity. Optionally, the terminal device sends the PDU session establishment request by using mobility management (MM) NAS signaling.

In an example, the MM NAS signaling may include session management-network slice selection assistance information (S-NSSAI), a DNN, a PDU session identifier (ID), and the PDU session establishment request.

Optionally, the PDU session establishment request may carry a PDU type and an SSC mode of a PDU session.

Optionally, the PDU session establishment request may further carry an AT type indicated by the terminal device.

After the AMF entity receives the PDU session establishment request sent by the terminal device, the AMF entity performs step 202, to be specific, selects an SMF entity for the PDU session of the terminal device. For example, the AMF entity may select an appropriate SMF entity based on the S-NSSAI and/or the DNN. This part of content is content well known to a person skilled in the art, and therefore details are not described herein.

After selecting the appropriate SMF entity, the AMF entity may perform step 203 next, to be specific, send a first N11 message to the selected SMF entity. The first N11 message may include an identifier of the terminal device, the DNN, and the PDU session establishment request.

Correspondingly, the SMF entity receives the first N11 message sent by the AMF entity. After receiving the first N11 message, the SMF entity may directly perform step 204a and step 204b, to obtain subscription information of the terminal device. During actual application, the SMF entity may first check whether the SMF entity stores the subscription information of the terminal device. When the SMF entity stores the subscription information of the terminal device, the SMF entity performs step 204a and step 204b. If the SMF entity stores the subscription information of the terminal device, the SMF entity may not perform step 204a or step 204b.

Specifically, step 204a is that the SMF entity sends, to a UDM entity, a request used to obtain the subscription information of the terminal device. When receiving the request, the UDM entity may query the subscription information of the terminal device based on the identifier of the terminal device, and return a subscription information response to the SMF entity in step 204*b* when obtaining the subscription information through querying. The subscription information of the terminal device is carried in the response.

Optionally, the SMF entity may further perform step 205, to be specific, initiate PDU-CAN session establishment to a PCF, to obtain a PCC rule of the PDU session. A specific implementation process of step 205 is content well known to a person skilled in the art, and therefore details are not described herein. This step is an optional step.

After obtaining the parameter information described in step 101, for example, the SSC mode of the PDU session, the PCC rule of the PDU session, or the QoS attribute of the PDU session, the SMF entity may perform step 206, to be specific, select a UPF entity for the PDU session and determine an AT type of the PDU session.

Optionally, the UPF entity may be selected for the PDU session based on one or more parameters of a location of the terminal device, load of the UPF entity, a capacity of the UPF entity, the DNN, the PDU type, the SCC mode of the PDU session, and the subscription information of the terminal device. A specific selection manner is content well known to a person skilled in the art, and therefore details are not described herein.

Optionally, the SMF entity may determine the AT type of the PDU session in the manners described in step 102, for example, determine the AT type of the PDU session based on the SSC mode of the PDU session.

Optionally, the SMF entity may further allocate an IP address to the PDU session.

If step 205 is not performed, the PDU-CAN session establishment may be performed in step 207, provided that the PDU-CAN session establishment is performed on an occasion shown in step 205 or an occasion shown in step 207. It should be noted that if a dynamic PCC rule has been deployed and the PDU type is IPv4 or IPv6, the SMF entity may initiate PDU-CAN session modification in step 207, and send, to the PCF entity, an IP address or a prefix of the IP address of the UE that is allocated by the SMF entity.

In step 208*a*, the SMF entity sends an N4 session establishment request to the UPF selected in step 206, where the N4 session establishment request carries an execution rule of the PDU session and tunnel information on a core network side. For example, the execution rule is a traffic flow template (TFT) corresponding to a QoS flow of the PDU session. The tunnel information on the core network side is an uplink data tunnel identifier of an N3 tunnel corresponding to the PDU session, and is used to uniquely identify data of the PDU session of the terminal device.

Correspondingly, the UPF entity may return an N4 session establishment response in step 208*b*.

Before, after, or when step 208*a* is performed, the SMF entity may perform step 209, to be specific, send a second N11 message to the AMF entity, and add the AT type determined in step 206 to the second N11 message. Optionally, the second N11 message further carries a PDU session establishment accept message. Optionally, the SMF entity may further indicate the AT type of the PDU session to the terminal device by using the PDU session establishment accept message.

Correspondingly, the AMF entity receives the second N11 message, and parses the second N11 message to obtain the AT type determined by the SMF entity for the PDU session, and then may perform step 210, to be specific, store a correspondence between the PDU session and the AT type. For example, the AMF entity may store the PDU session identifier and a corresponding AT type in a table, or may store the PDU session identifier and the corresponding AT type in a form of a key-value pair.

Optionally, the AMF entity may further store a correspondence among the PDU session, the AT type, and the SMF entity selected in step 202.

Optionally, the SMF entity may further indicate the AT type of the PDU session to the terminal device in step 211. Optionally, all function entities may perform step 212, to be specific, perform a remaining PDU session establishment procedure.

It should be noted that an execution sequence of step 211 and step 212 is not limited. To be specific, the AMF entity may perform step 211 after step 212, for example, when the PDU session needs to be activated. In this case, a purpose of performing step 211 is that the terminal device can activate or restore the PDU session based on the indicated AT type. If the AMF entity performs step 211 before step 212, in this case, a purpose of performing step 211 is that the terminal device first stores the indicated AT type, and can activate the PDU session based on the indicated AT type when the PDU session needs to be activated.

Optionally, after step 212, the AMF entity receives a downlink session management message sent by the SMF entity, and may route the downlink session management message based on an AT corresponding to the AT type obtained in step 209.

Figure 5:
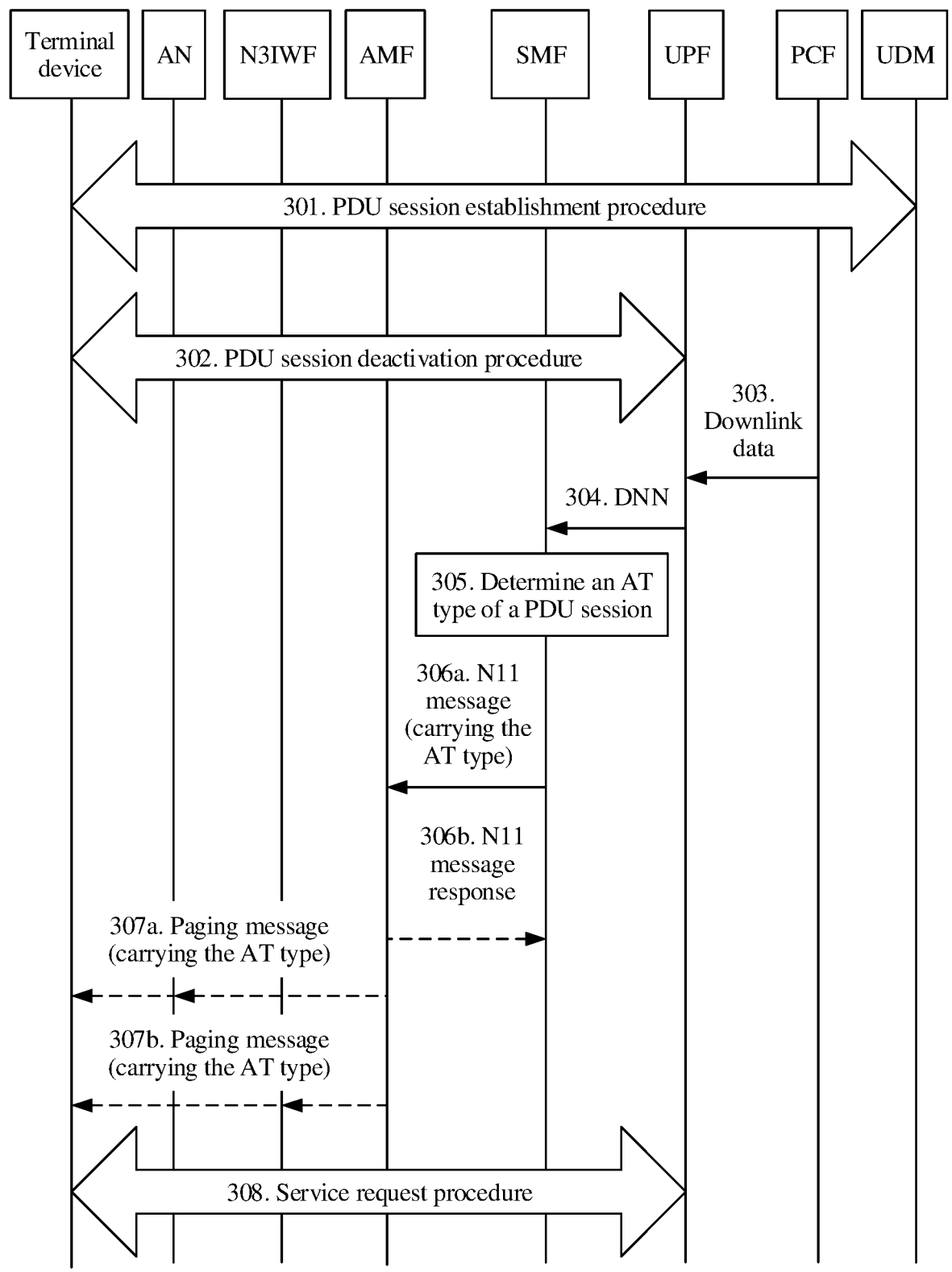
FIG. 5 is a flowchart of another specific example of a communication method according to an embodiment of the present disclosure.

Next, FIG. 5 is a flowchart of another example of a communication method according to an embodiment of the present disclosure. In this embodiment of the present disclosure, when a PDU session has been established and is in a deactivated state, if an SMF entity receives a DDN, the SMF entity determines an AT type of the PDU session. Specifically, the method includes the following steps.

Step 301: Perform a PDU session establishment procedure. During actual application, step 301 may be performed according to an existing PDU session establishment procedure, or may be performed according to the establishment procedure shown in FIG. 4A and FIG. 4B.

Step 302: Perform a PDU session deactivation procedure. Step 302 may be performed according to an existing deactivation procedure. This part of content is content well known to a person skilled in the art, and therefore details are not described herein.

After a PDU session is deactivated, a UPF entity receives downlink data of the PDU session of a terminal device. This is step 303. Then, the UPF entity may send a DDN to an SMF entity through an N4 interface, to notify the SMF entity that there is downlink data to be sent to the terminal device. This is step 304.

After the SMF entity receives the DDN sent by the UPF entity, or when the SMF entity receives an activation request sent by an AMF entity, the SMF entity may perform step 305, to be specific, determine an AT type of the PDU session. Optionally, if step 301 is performed according to the existing establishment procedure, to be specific, if the AT type of the PDU session is not determined in the PDU session establishment process, the AT type of the PDU session may be determined in step 305 in the manners described in step 102.

Optionally, if the PDU session is established in step 301 according to the establishment procedure shown in FIG. 4A and FIG. 4B, to be specific, if the AT type of the PDU session has been determined in step 206, the SMF entity may locally store a correspondence between the PDU session and the AT type, and the SMF entity may directly determine the AT type of the PDU session in step 305 based on the correspondence.

After determining the AT type of the PDU session, the SMF entity may perform step 306a, to be specific, send an N11 message to the AMF entity through an N11 interface, and add the AT type determined in step 305 to the N11 message.

Optionally, after receiving the N11 message, the AMF entity may further perform step 306b, to be specific, send an N11 response to the SMF entity, to notify the SMF entity that the UE is currently unreachable. This step is an optional step. In other words, the AMF entity may not need to send the N11 message response.

The AMF entity may perform step 307a to notify the terminal device of the AT type of the PDU session. It should be noted that step 307a indicates that a paging message is sent to the terminal device by using a network node of a 3GPP AT, and the paging message includes indication information.

Optionally, the AMF entity may alternatively notify the terminal device of the AT type of the PDU session in step 307b. Step 307b indicates that a paging message is sent to the terminal device by using a network node of a non-3GPP AT, for example, an N3IWF entity, and the paging message includes indication information.

When receiving the AT type that is of the PDU session and that is sent by the AMF entity, the terminal device may trigger execution of a service request procedure, namely, a PDU session activation procedure.

Optionally, after step 308, to be specific, when the PDU session is in an activated state, the AMF entity receives a downlink session management message sent by the SMF entity, and may route the downlink session management message based on an AT corresponding to the AT type obtained in step 306a.

Figure 6A:
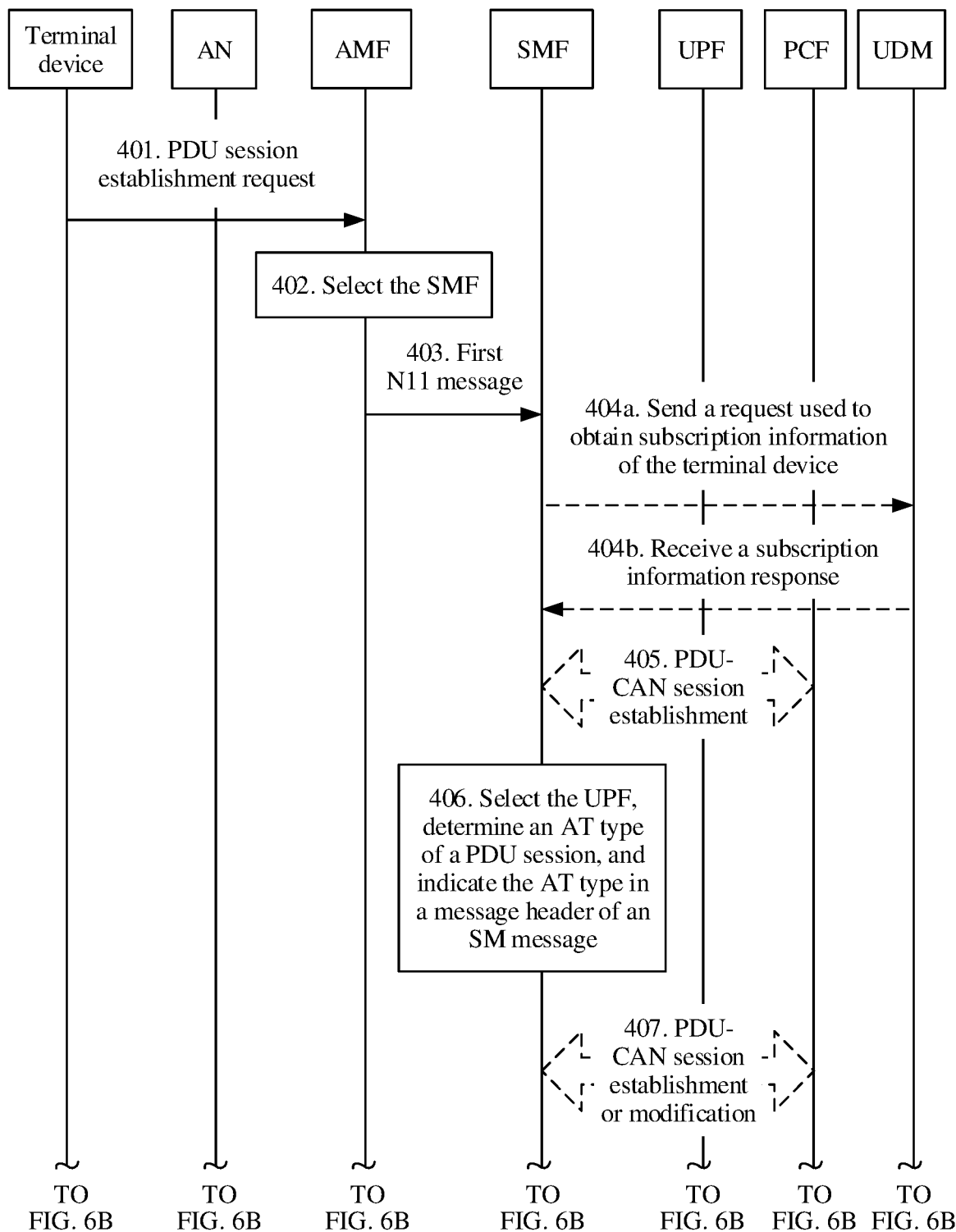
FIG. 6A and FIG. 6B are a flowchart of still another specific example of a communication method according to an embodiment of the present disclosure.
Figure 6B:
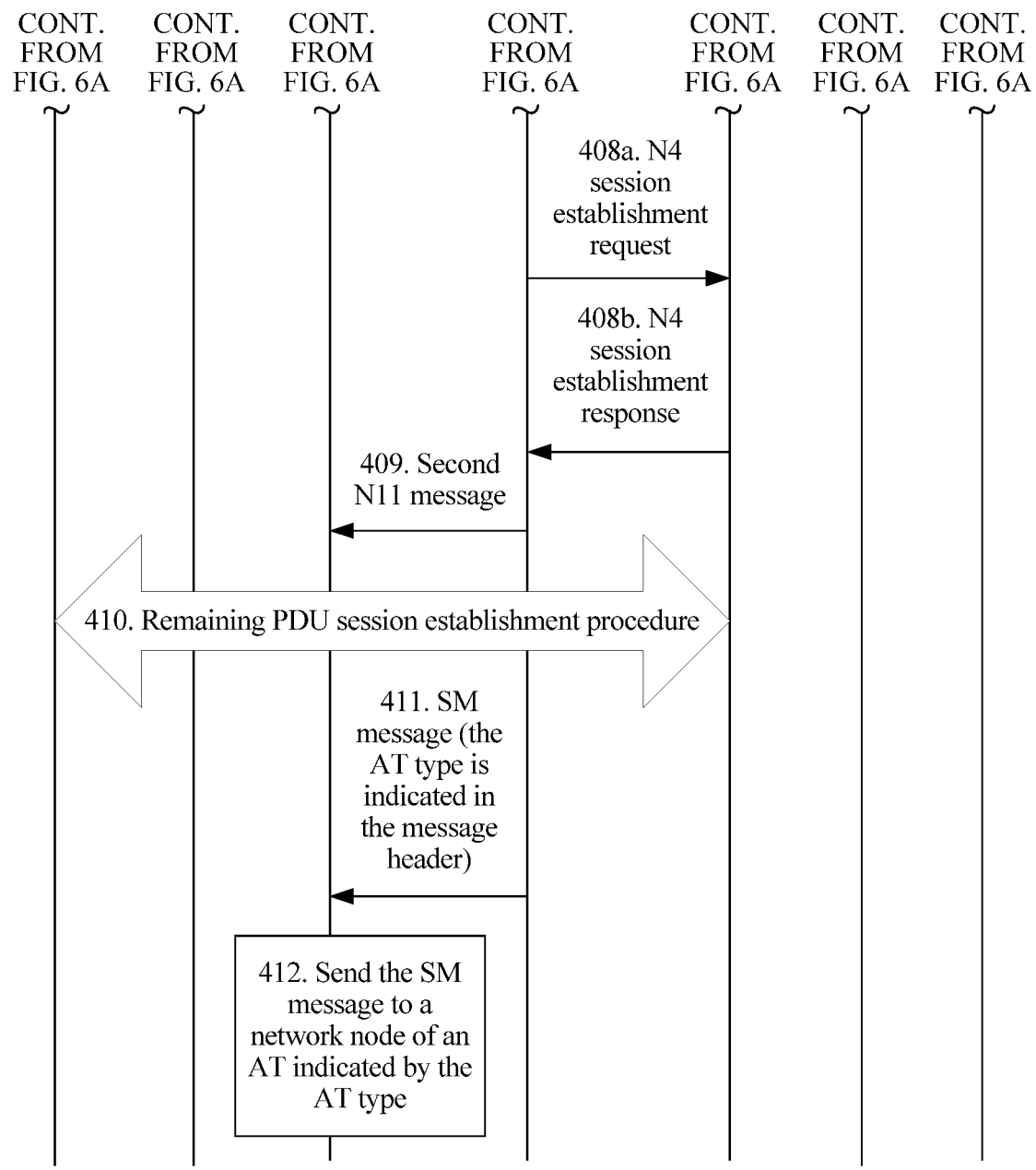

Next, FIG. 6A and FIG. 6B are a flowchart of still another example of a communication method according to an embodiment of the present disclosure. In this embodiment of the present disclosure, an AT type of a PDU session is determined in a PDU session establishment process, and an SMF entity adds the AT type to a message header of a session management message. Specifically, the method includes the following steps.

Step 401 to step 405 are the same as step 201 to step 205, and therefore details are not described herein again.

In step 406, in addition to that a step that is the same as step 206 is performed, the AT type is further indicated in a message header of an SM message. For example, an "AT type" bit is set in the message header of the SM message. After the AT type is determined, a bit setting operation is performed on the bit. For example, when the determined AT type is a 3GPP AT type, a value of the bit is set to 0. When the determined AT type is a non-3GPP AT type, a value of the bit is set to 1.

Step 407 to step 409 are the same as step 207 to step 209, and therefore details are not described herein again. It should be noted that in this embodiment, in step 409, the second N11 message may not carry the AT type. An advantage of carrying the AT type is that the AMF entity stores a correspondence between the AT type and the PDU session, and indicates the AT type of the PDU session to the terminal device when the PDU session needs to be activated, so that the terminal device performs a PDU session activation procedure.

Step 410 is the same as step 212, and therefore details are not described herein again.

In step 411, the SMF entity sends the SM message to the AMF entity. By parsing the message header of the SM message, the AMF entity parse can obtain the AT type that is of the PDU session and that is determined by the SMF entity.

Next, the AMF entity may perform step 412, to be specific, send the SM message to a network node of an AT indicated by the AT type.

It may be learned from the foregoing descriptions that, in the embodiments of the present disclosure, the SMF entity may determine the AT type of the PDU session of the terminal device based on the parameter information, and notify the AMF entity of the AT type. Therefore, the AMF entity may route the downlink session management message based on the determined AT type, or indicate the AT type to the terminal device, so that the terminal device activates the PDU session corresponding to the determined AT type.

Optionally, the network element shown in FIG. 2 may be some or all of the entities in FIG. 1a and FIG. 1b, and is used to implement some or all of the steps in the methods shown in FIG. 3 to FIG. 6A and FIG. 6B. A specific configuration may be determined based on an actual requirement.

Specifically, when the network element shown in FIG. 2 is an SMF entity, the processor 10 is configured to obtain parameter information, and determine an access technology type for a protocol data unit PDU session of a terminal device based on the parameter information, and the transmitter 20 is configured to send indication information to an access and mobility management function entity, where the indication information is used to indicate the access technology type of the PDU session.

Optionally, the parameter information includes at least one type of the following information a service and session continuity SSC mode of the PDU session, a quality of service QoS attribute of the PDU session, a policy control and charging PCC rule of the PDU session, subscription information of the terminal device, and an access technology type indicated by the terminal device.

Optionally, the parameter information is the SSC mode of the PDU session, and the processor 10 is configured to if the SSC mode of the PDU session represents that the PDU session supports service and session continuity, determine that the access technology type of the PDU session is a 3rd generation partnership project 3GPP access technology.

Optionally, the parameter information is the QoS attribute of the PDU session, and the processor 10 is configured to if the QoS attribute of the PDU session is a guaranteed bit rate GBR type, determine that the access technology type of the PDU session is a 3rd generation partnership project 3GPP access technology.

Optionally, the parameter information is the PCC rule of the PDU session and the QoS attribute of the PDU session, and the processor 10 is configured to determine the access technology type of the PDU session based on a correspondence that is included in the PCC rule of the PDU session and that is between the QoS attribute of the PDU session and a preset access technology type.

Optionally, the parameter information is the subscription information, and the processor 10 is configured to determine, as the access technology type of the PDU session, an access technology type allowed to be used in the subscription information, or determine the access technology type of the PDU session based on a mapping relationship that is included in the subscription information and that is between an access technology type and a data network name DNN and based on a DNN corresponding to the PDU session.

Optionally, the apparatus further includes the receiver 30, the parameter information includes the access technology type indicated by the terminal device and/or the service and session continuity SSC mode of the PDU session, and the processor 10 is configured to receive, by using the receiver 30, a first N11 message sent by the access and mobility management function entity, where the first N11 message includes a PDU session establishment request, the PDU session establishment request is used to request to establish the PDU session for the terminal device, and the PDU session establishment request includes the parameter information, and obtain the parameter information from the PDU session establishment request.

Optionally, the indication information is carried in a second N11 message or a session management message.

Further, for specific implementations of the operations performed by the processor 10, the receiver 30, and the transmitter 20 included in the network element used as the SMF entity, refer to corresponding steps performed by the SMF entity in the embodiments in FIG. 3 to FIG. 6A and FIG. 6B. Details are not described herein in this embodiment of the present disclosure.

In another optional manner, when the network element shown in FIG. 2 is an AMF entity, the receiver 30 is configured to receive indication information sent by a session management function entity, where the indication information is used to indicate an access technology type of a protocol data unit PDU session of a terminal device, and the transmitter 20 is configured to when a link of an access technology indicated by the access technology type is in a connected mode, send, to a network node of the access technology indicated by the access technology type, a session management message received from the session management function entity, or when a link of an access technology indicated by the access technology type is in an idle mode, send the indication information to the terminal device.

Optionally, the indication information is carried in a second N11 message or the session management message.

Optionally, the transmitter 20 is configured to when the terminal device is in an idle mode, send a paging message to the terminal device by using the access technology indicated by the access technology type, where the paging message includes the indication information, or when the terminal device is in a connected mode and the link that is of the access technology indicated by the access technology type and that is used by the terminal device is in an idle mode, send the indication information to the terminal device over a connected-mode link that is of another access technology and that is used by the terminal device, or when the terminal device is in a connected mode and the link that is of the access technology indicated by the access technology type and that is used by the terminal device is in an idle mode, send a paging message to the terminal device over the link of the access technology indicated by the access technology type, where the paging message includes the indication information.

Further, for specific implementations of the operations performed by the processor 10, the receiver 30, and the transmitter 20 included in the network element used as the AMF entity, refer to corresponding steps performed by the AMF entity in the embodiments in FIG. 3 to FIG. 6A and FIG. 6B. Details are not described herein in this embodiment of the present disclosure.

Figure 7:
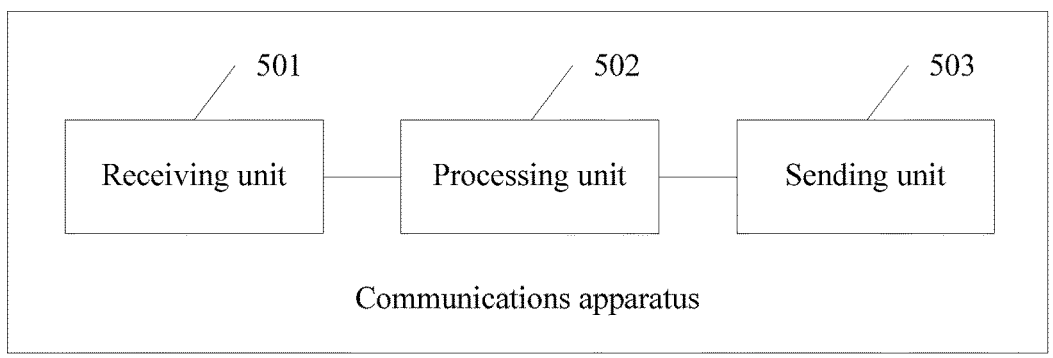
FIG. 7 is a functional block diagram of a communications apparatus according to an embodiment of the present disclosure.

Based on a same disclosure concept, an embodiment of the present disclosure further provides a simplified functional block diagram of a communications apparatus. The communications apparatus may be an independent network element, or may be integrated into an SMF entity. As shown in FIG. 7, the communications apparatus includes a receiving unit 501, a processing unit 502, and a sending unit 503.

The processing unit 502 is configured to obtain parameter information, and determine an access technology type for a protocol data unit PDU session of a terminal device based on the parameter information. The sending unit 503 is configured to send indication information to an access and mobility management function entity, where the indication information is used to indicate the access technology type of the PDU session.

Optionally, the parameter information includes at least one type of the following information: a service and session continuity SSC mode of the PDU session, a quality of service QoS attribute of the PDU session, a policy control and charging PCC rule of the PDU session, subscription information of the terminal device, and an access technology type indicated by the terminal device.

Optionally, the parameter information is the SSC mode of the PDU session, and the processing unit 502 is configured to if the SSC mode of the PDU session represents that the PDU session supports service and session continuity, determine that the access technology type of the PDU session is a 3rd generation partnership project 3GPP access technology.

Optionally, the parameter information is the QoS attribute of the PDU session, and the processing unit 502 is configured to if the QoS attribute of the PDU session is a guaranteed bit rate GBR type, determine that the access technology type of the PDU session is a 3rd generation partnership project 3GPP access technology.

Optionally, the parameter information is the PCC rule of the PDU session and the QoS attribute of the PDU session, and the processing unit 502 is configured to determine the access technology type of the PDU session based on a correspondence that is included in the PCC rule of the PDU session and that is between the QoS attribute of the PDU session and a preset access technology type.

Optionally, the parameter information is the subscription information, and the processing unit 502 is configured to determine, as the access technology type of the PDU session, an access technology type allowed to be used in the subscription information, or determine the access technology type of the PDU session based on a mapping relationship that is included in the subscription information and that is between an access technology type and a data network name DNN and based on a DNN corresponding to the PDU session.

Optionally, the apparatus further includes the receiving unit 501, the parameter information includes the access technology type indicated by the terminal device and/or the service and session continuity SSC mode of the PDU session, and the processing unit 502 is configured to receive, by using the receiving unit 501, a first N11 message sent by the access and mobility management function entity, where the first N11 message includes a PDU session establishment request, the PDU session establishment request is used to request to establish the PDU session for the terminal device, and the PDU session establishment request includes the parameter information, and obtain the parameter information from the PDU session establishment request.

Optionally, the indication information is carried in a second N11 message or a session management message.

Further, for specific implementations of the operations performed by the receiving unit 501, the processing unit 502, and the sending unit 503 included in the communications apparatus configured to implement functions of the SMF entity, refer to corresponding steps performed by the SMF entity in the embodiments in FIG. 3 to FIG. 6A and FIG. 6B. Details are not described herein in this embodiment of the present disclosure.

Figure 8:
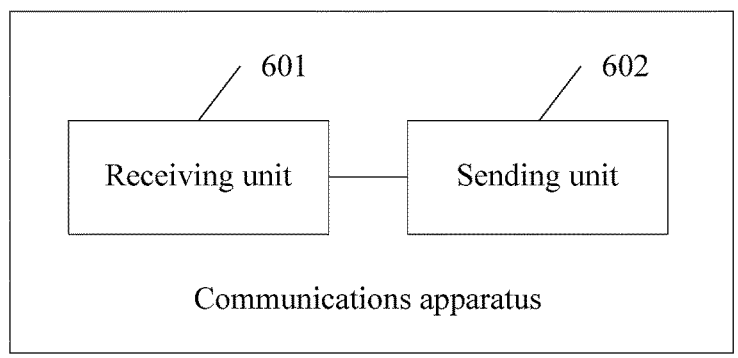
FIG. 8 is a functional block diagram of another communications apparatus according to an embodiment of the present disclosure.

Based on a same disclosure concept, an embodiment of the present disclosure further provides a simplified functional block diagram of another communications apparatus. The communications apparatus may be an independent network element, or may be integrated into an AMF entity. As shown in FIG. 8, the communications apparatus includes a receiving unit 601 and a sending unit 602.

The receiving unit 601 is configured to receive indication information sent by a session management function entity, where the indication information is used to indicate an access technology type of a protocol data unit PDU session of a terminal device. The sending unit 602 is configured to when a link of an access technology indicated by the access technology type is in a connected mode, send, to a network node of the access technology indicated by the access technology type, a session management message received from the session management function entity, or when a link of an access technology indicated by the access technology type is in an idle mode, send the indication information to the terminal device.

Optionally, the indication information is carried in a second N11 message or the session management message.

Optionally, the sending unit 602 is configured to when the terminal device is in an idle mode, send a paging message to the terminal device by using the access technology indicated by the access technology type, where the paging message includes the indication information, or when the terminal device is in a connected mode and the link that is of the access technology indicated by the access technology type and that is used by the terminal device is in an idle mode, send the indication information to the terminal device over a connected-mode link that is of another access technology and that is used by the terminal device, or when the terminal device is in a connected mode and the link that is of the access technology indicated by the access technology type and that is used by the terminal device is in an idle mode, send a paging message to the terminal device over the link of the access technology indicated by the access technology type, where the paging message includes the indication information.

Further, for specific implementations of the operations performed by the receiving unit 601 and the sending unit 602 included in the communications apparatus configured to implement functions of the AMF entity, refer to corresponding steps performed by the AMF entity in the embodiments in FIG. 3 to FIG. 6A and FIG. 6B. Details are not described herein in this embodiment of the present disclosure.

It should be noted that the communications apparatus is displayed in a form of a functional unit. Without limitation, the term "unit" used in this specification may be an application-specific integrated circuit (ASIC), an electronic circuit, a (shared, dedicated, or group) processor and a memory, or a combinatorial logic circuit for executing one or more software or firmware programs, and/or another appropriate component that provides the function.

A person skilled in the art should understand that the embodiments of the present disclosure may be provided as a method, a system, or a computer program product. Therefore, the embodiments of the present disclosure may use a form of hardware only embodiments, software only embodiments, or embodiments with a combination of software and hardware. In addition, the embodiments of the present disclosure may use a form of a computer program product that is implemented on one or more computer-usable storage media (including but not limited to a magnetic disk memory, an optical memory, and the like) that include computer-usable program code.

This application is described with reference to the flowcharts and/or block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more procedures in the flowcharts and/or in one or more blocks in the block diagrams.

These computer program instructions may be alternatively stored in a computer readable memory that can instruct a computer or another programmable data processing device to work in a specific manner, so that the instructions stored in the computer readable memory generate an artifact that includes an instruction apparatus. The instruction apparatus implements a specified function in one or more procedures in the flowcharts and/or in one or more blocks in the block diagrams.

These computer program instructions may be alternatively loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more procedures in the flowcharts and/or in one or more blocks in the block diagrams.

Apparently, a person skilled in the art can make various modifications and variations to this application without departing from the spirit and scope of this application. In this way, this application is intended to cover these modifications and variations of this application provided that they fall within the scope of the claims of this application and equivalent technologies thereof.

What is claimed is:

1. A communication method comprising:
  obtaining, by a session management function entity, parameter information, wherein the parameter information comprises subscription information of a terminal device;
  determining, by the session management function entity during a protocol data unit (PDU) session establishment process, an access technology type for a PDU session of the terminal device according to the subscription information and a data network name (DNN) corresponding to the PDU session, the subscription information including a mapping relationship between the access technology type and the DNN, wherein the access technology type for the PDU session of the terminal device indicates at least one of a 3rd generation partnership project (3GPP) access technology or a non-3GPP access technology;
  adding, by the session management function entity, indication information to a session information message; and sending, by the session management function entity, the session information message comprising the indication information to an access and mobility management function entity, wherein the indication information indicates the access technology type of the PDU session.

2. The method according to claim 1, wherein the parameter information comprises at least one type of a service and session continuity (SSC) mode of the PDU session, a quality of service (QoS) attribute of the PDU session, a policy and charging control (PCC) rule of the PDU session, or the access technology type indicated by the terminal device.

3. The method according to claim 2, wherein the parameter information is the SSC mode of the PDU session, and wherein the determining the access technology type for the PDU session of the terminal device comprises:
determining, by the session management function entity, in response to the SSC mode of the PDU session representing that the PDU session supports service and session continuity, that the access technology type of the PDU session is a 3GPP access technology.

4. The method according to claim 2, wherein the parameter information is the QoS attribute of the PDU session, and wherein the determining the access technology type for the PDU session of the terminal device comprises:
determining, by the session management function entity, in response to the QoS attribute of the PDU session being a guaranteed bit rate (GBR) type, that the access technology type of the PDU session is a 3GPP access technology.

5. The method according to claim 2, wherein the parameter information is the PCC rule of the PDU session and the QoS attribute of the PDU session, and wherein the determining the access technology type for the PDU session of the terminal device comprises:
determining, by the session management function entity, the access technology type of the PDU session according to the QoS attribute of the PDU session and further according to a correspondence in the PCC rule of the PDU session, wherein the correspondence is between the QoS attribute of the PDU session and a preset access technology type.

6. The method according to claim 2, wherein determining the access technology type for the PDU session of the terminal device further comprises:
determining, by the session management function entity, the access technology type allowed to be used in the subscription information as the access technology type of the PDU session.

7. The method according to claim 1, wherein the indication information is carried in at least one of a second N11 message or a session management message.

8. The method according to claim 1, wherein the access technology type for the PDU session of the terminal device indicates the 3GPP access technology and the non-3GPP access technology.

9. The method according to claim 1, wherein sending the session information message comprises performing at least one of:
sending, by the session management function entity during the PDU session establishment process, the session information message;
sending, by the session management function entity, after the PDU session is established and the PDU session is in an activated state, the session information message; or
sending, by the session management function entity, after the PDU session is established and the PDU session is in a deactivated state, the session information message.

10. A communications method comprising:
obtaining, by a session management function entity, parameter information, wherein the parameter information comprises subscription information of a terminal device;
determining, by the session management function entity during a protocol data unit (PDU) session establishment process, an access technology type for a PDU session of the terminal device according to the subscription information and a data network name (DNN) corresponding to the PDU session, the subscription information including a mapping relationship between the access technology type and the DNN, wherein the access technology type for the PDU session of the terminal device indicates at least one of a 3rd generation partnership project (3GPP) access technology or a non-3GPP access technology;
adding, by the session management function entity, indication information to a session information message;
sending, by the session management function entity, the session information message comprising the indication information to an access and mobility management function entity, wherein the indication information indicates the access technology type of the PDU session; and
performing at least one of
sending, by the access and mobility management function entity to a network node of the access technology indicated by the access technology type, in response to a link of an access technology indicated by the access technology type being in a connected mode, a session management message received from the session management function entity; or
sending, by the access and mobility management function entity, in response to the link of an access technology indicated by the access technology type being in an idle mode, the indication information to the terminal device.

11. The method according to claim 10, wherein the parameter information comprises at least one type of a service and session continuity (SSC) mode of the PDU session, a quality of service (QoS) attribute of the PDU session, a policy and charging control (PCC) rule of the PDU session, or the access technology type indicated by the terminal device.

12. The method according to claim 11, wherein the parameter information is the SSC mode of the PDU session, and wherein the determining the access technology type for the PDU session of the terminal device comprises:
determining, by the session management function entity, in response to the SSC mode of the PDU session representing that the PDU session supports service and session continuity, that the access technology type of the PDU session is a 3GPP access technology.

13. The method according to claim 11, wherein the parameter information is the QoS attribute of the PDU session, and wherein the determining, by the session management function entity, the access technology type for the PDU session of the terminal device comprises:
determining, by the session management function entity, in response to the QoS attribute of the PDU session being a guaranteed bit rate (GBR) type, that the access technology type of the PDU session is a 3GPP access technology.

14. The method according to claim 11, wherein the parameter information is the PCC rule of the PDU session and the QoS attribute of the PDU session, and wherein the determining the access technology type for the PDU session of the terminal device comprises:

determining, by the session management function entity, the access technology type of the PDU session according to the QoS attribute of the PDU session and further according to a correspondence in the PCC rule of the PDU session, wherein the correspondence is between the QoS attribute of the PDU session and a preset access technology type.

15. The method according to claim 11, wherein determining the access technology type for the PDU session of the terminal device further comprises:

determining, by the session management function entity, an access technology type allowed to be used in the subscription information as the access technology type of the PDU session.

16. The method according to claim 10, wherein the indication information is carried in a second N11 message or the session management message.

17. The method according to claim 10, wherein the sending, by the access and mobility management function entity, the indication information to the terminal device comprises performing at least one of:

sending, by the access and mobility management function entity, in response to the terminal device being in an idle mode, a paging message to the terminal device using the access technology indicated by the access technology type, wherein the paging message comprises the indication information; or sending, by the access and mobility management function entity, in response to the terminal device being in a connected mode and further in response to the link that is of the access technology indicated by the access technology type and that is used by the terminal device being in an idle mode, the indication information to the terminal device over a connected-mode link that is of another access technology and that is used by the terminal device; or sending, by the access and mobility management function entity, in response to the terminal device being in the connected mode and further in response to the link that is of the access technology indicated by the access technology type and that is used by the terminal device going in an idle mode, a paging message to the terminal device over the link of the access technology indicated by the access technology type, wherein the paging message comprises the indication information.

18. A session management function entity comprising:

a non-transitory memory storage comprising instructions; and a processor in communication with the non-transitory memory storage, wherein the processor executes the instructions to:

obtain parameter information, wherein the parameter information comprises subscription information of a terminal device;

determine during a protocol data unit (PDU) session establishment process, an access technology type for a PDU session of the terminal device according to the subscription information and a data network name (DNN) corresponding to the PDU session, the subscription information including a mapping relationship between the access technology type and the DNN, wherein the access technology type for the PDU session of the terminal device indicates at least one of a 3rd generation partnership project (3GPP) access technology or a non-3GPP access technology;

add indication information to a session information message; and send the session information message comprising the indication information to an access and mobility management function entity, wherein the indication information indicates the access technology type of the PDU session.

19. The session management function entity according to claim 18, wherein the parameter information comprises at least one type of a service and session continuity (SSC) mode of the PDU session, a quality of service (QoS) attribute of the PDU session, a policy and charging control (PCC) rule of the PDU session, or an access technology type indicated by the terminal device.

20. The session management function entity according to claim 19, wherein the parameter information is the SSC mode of the PDU session, and wherein the processor further executes instructions to determine, in response to the SSC mode of the PDU session representing that the PDU session supports service and session continuity, that the access technology type of the PDU session is a 3GPP access technology.

* * * * *